UNITED STATES PATENT OFFICE.

EMIL WEBER, OF SCHWEPNITZ, SAXONIA.

METHOD FOR PRODUCING PASTES THAT MAY BE POURED.

1,394,241. Specification of Letters Patent. Patented Oct. 18, 1921.

No Drawing. Application filed June 15, 1920. Serial No. 389,253.

*To all whom it may concern:*

Be it known that I, Dr. EMIL WEBER, chemist, a subject of the German State, and resident of Schwepnitz, in the Saxonia State, have invented certain new and useful Improvements in a Method for Producing Pastes that May Be Poured; (for which applications have been filed in the following countries: Germany, August 13, 1917; Austria, January 21, 1918; Hungary, January 22, 1918; France, February 2, 1918; Belgium, March 1, 1918; Italy, March 11, 1918; Australia, October 15, 1918; Japan, March 24, 1919; Czecho-Slovakia, Sept. 22, 1919;) and I do hereby declare the following to be a full, clear, and exact description of the invention, such as will enable others skilled in the art to which it appertains to make and use the same.

It is known that it is possible to liquefy ceramic or more generally said clay—or kaolin—bearing pastes by adding alkali thereto in such a manner that they afterward may be poured into molds. Likewise, unplastic stiff pulps and materials being finely dispersed may also be rendered easily fluid by alkali. It has been proposed to improve the fluidity, which does not set in according to hard and fast rules nor to the same extent for the various materials considered, by the addition of earthy substances such as cassel-brown, peat or brown-coal. Such additions, however, gave rise to inconveniences rendering impossible their practical use for continuous operation. The gein or humus substance together with the alkali, invaded the pores of the plaster-mold used, clogging it quickly, so as to render the costly plaster-molds in comparatively short time, waste. The coloring gein attaches itself in a really surprising manner to the plaster-molds.

Now, strange enough, it has been ascertained by a great many experiments, that there exists materials which it is much more favorable to add to the pastes to be poured as described, which improve the fluidity, without making the paste hard to work or impairing the constitution of the mold itself. Vegetable extracts of neutral or alkaline reaction were shown to have this specific effect, though this action was not to be foreseen.

Thus the present invention has for its object to improve the pouring of clay-pastes or unplastic stiff pulps through alkali mixed up with a small percentage of vegetable extracts.

Such vegetable extracts have been found to be specially effective which have a certain frothing capacity or spuminess, as particularly the saponaceous bodies and extracts or on the other hand matters, having their origin from the disintegration of the cellulose (lignin).

Among the saponaceous substances the pure saponins, githagin, quillaja and senegin come under consideration; but besides these extracts of any saponin-bearing plants, barks, roots, bulbs, fruits, such as of the quillaia, of soapwort, of cock-wheed, of sowbreads, and more generally of the saponin-bearing plants, as well as decoctions of ivy and of capsules of the chestnut, only neutral saponins, soluble in water, are fit for the object in question here.

An effect similar to that of the saponins is obtained by the cellulose-waste or again by the cellular pitch. Among these the alkaline waste-lyes may be immediately used while the acidulous ones of sulfite-cellulose are first to be neutralized.

The quantities of such materials required for insuring the most favorable liquefaction of pastes to be poured into molds are so exceedingly small, that even after extensive service the plaster-molds are by no means impaired as regards to their qualification for molding.

The invention covers likewise the simultaneous use of saponin or saponin-bearing extracts and waste-lye of cellulose, thereby admitting to reduce the quantity of additional matter under given circumstances.

Patent claims:

1. Method for producing pastes that may be poured into molds from clay- or kaolin-bearing mixtures and unplastic materials, which by the mere addition of alkali are only liquefied with difficulty, by the addition of small quantities of vegetable extracts of a non-acid character.

2. A mode of operation of the process as per claim 1, the distinguishing feature being the addition of vegetable saponaceous material.

3. A mode of operation of the process as per claim 1, the distinguishing feature being the simultaneous addition of saponin and waste-lyes of cellulose.

4. The method of rendering liquid ceramic pastes that are liquefied with difficulty by alkali which comprises adding a saponin thereto.

In testimony that I claim the foregoing as my invention, I have signed my name in presence of two subscribing witnesses.

Dr. EMIL WEBER.

Witnesses:
K. WAGNER,
ORKIRO ROPJ.